United States Patent
Wu (10) Patent No.: US 10,790,684 B2
(45) Date of Patent: Sep. 29, 2020

(54) ENERGY SUPPLY DEPOT AND ENERGY SUPPLY METHOD

(71) Applicant: BAICELLS TECHNOLOGIES CO. LTD., Beijing (CN)

(72) Inventor: Yanguang Wu, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 168 days.

(21) Appl. No.: 16/081,601

(22) PCT Filed: Feb. 28, 2017

(86) PCT No.: PCT/CN2017/075249
§ 371 (c)(1),
(2) Date: Aug. 31, 2018

(87) PCT Pub. No.: WO2017/148373
PCT Pub. Date: Sep. 8, 2017

(65) Prior Publication Data
US 2019/0097440 A1    Mar. 28, 2019

(30) Foreign Application Priority Data
Mar. 1, 2016  (CN) .......................... 2016 1 0116302

(51) Int. Cl.
*H02J 7/02*   (2016.01)
*H02J 7/00*   (2006.01)
*B60L 53/60*  (2019.01)

(52) U.S. Cl.
CPC ............ *H02J 7/0027* (2013.01); *B60L 53/60* (2019.02); *B60L 2230/16* (2013.01); *B60Y 2200/91* (2013.01); *B60Y 2300/91* (2013.01)

(58) Field of Classification Search
CPC ...................................................... H02J 7/0026
(Continued)

(56) References Cited

U.S. PATENT DOCUMENTS

2014/0129059 A1*  5/2014  Scarlatti .................. G05D 1/00
                                                                701/16

FOREIGN PATENT DOCUMENTS

CN        104852475       *   8/2015    ............ H02J 7/0047
CN        104852475 A        8/2015
(Continued)

OTHER PUBLICATIONS

International Search Report (PCT/CN2017/075249); dated Apr. 25, 2017.

*Primary Examiner* — Edward Tso
*Assistant Examiner* — Ahmed H Omar
(74) *Attorney, Agent, or Firm* — Howard & Howard Attorneys PLLC (57) ABSTRACT

The present disclosure discloses an energy supply station and an energy supply method. The energy supply station includes: one or more parking places for parking unmanned vehicles; an energy supply device configured to supply energy to the unmanned vehicles parked at the parking places; and a communication device configured to receive an unmanned vehicle energy supply request, guide an unmanned vehicle to be supplied with energy, corresponding to the unmanned vehicle energy supply request, to be parked at the parking place according to the received unmanned vehicle energy supply request, and cause the energy supply device to supply energy to the unmanned vehicle to be supplied with energy.

6 Claims, 2 Drawing Sheets

(58) Field of Classification Search
USPC .................................................. 320/104, 109
See application file for complete search history.

(56) References Cited

FOREIGN PATENT DOCUMENTS

| | | | |
|---|---|---|---|
| CN | 104908966 A | 9/2015 | |
| CN | 104973263 A | 10/2015 | |
| CN | 105226836 A | 1/2016 | |
| CN | 105790350 A | 7/2016 | |

* cited by examiner

ENERGY SUPPLY DEPOT AND ENERGY SUPPLY METHOD

The present application is the National Stage of International Patent Application No. PCT/CN2017/075249, filed Feb. 28, 2017, which claims priority to and all the benefits of Chinese Patent Application No. 201610116302.4, filed on Mar. 1, 2016, the contents of which are expressly incorporated herein by reference in their entirety.

TECHNICAL FIELD

The present disclosure relates to the field of unmanned vehicles, and more particularly to an energy supply station and an energy supply method.

BACKGROUND

An unmanned vehicle is widely used in a civilian field and a military field. Use in the civilian field mainly includes: mapping, geological surveying, disaster monitoring, meteorological detection, air traffic control, border control, communication relay, pesticide spraying and the like. Use in the military field mainly includes: electronic interference, high-altitude aerial photography, high-altitude control and guidance and the like. However, due to the limitations of the weight of an onboard battery and the power of the onboard battery, the flight time of a small unmanned vehicle is generally short.

At present, there are many researches on a battery of the unmanned vehicle. People hope to break through the limitation of the battery of the unmanned vehicle, thus enabling the unmanned vehicle to be applied in a wider range. In addition to such a conventional means of reducing the weight of the unmanned vehicle and improving the cruising ability of the battery, the related art also adopts other technical solutions for solving the battery problem of the unmanned vehicle, mainly including two categories: battery replacement and battery charging. The battery replacement solution proposes several technical innovation solutions, such as power-off protection and automatic battery replacement. The battery charging proposes some technical solutions in terms of rechargeable battery protection, automatic charging control, a charging mode (wired or wireless), a power supply type (a gasoline generator, a solar panel, a car battery, a storage battery, an overhead transmission line, or the like).

However, all the current energy supply solutions for an unmanned vehicle are of proprietary and special-purpose solutions. The special-purpose energy supply solutions are often directed to a series of products of a certain model or a certain manufacturer, which requires that a battery, the unmanned vehicle, a charging station, a blocking device, and the like must all be matched, and otherwise they will not work properly. The current energy supply solution cannot be used to charge or replace batteries for unmanned vehicles of other manufacturers because of no consideration of universality and openness. The current energy supply solution cannot effectively prevent unmanned vehicles of other manufacturers from intruding and performing illegal operations such as battery charging/replacement in an unmanned scene because of no consideration of the safety.

With respect to the above problems, no effective solution has been proposed yet at present.

SUMMARY

The embodiments of the present disclosure provide an energy supply station and an energy supply method, capable of at least solving the technical problems of low universality and low openness caused when all energy supply solutions for an unmanned vehicle are of proprietary and special-purpose solutions.

According to an aspect of an embodiment of the present disclosure, there is provided an energy supply station. The energy supply station includes: one or more parking places for parking unmanned vehicles; an energy supply device configured to supply energy to the unmanned vehicles parked at the parking places; and a communication device configured to receive an unmanned vehicle energy supply request, guide an unmanned vehicle to be supplied with energy, corresponding to the unmanned vehicle energy supply request, to be parked at the parking place according to the received unmanned vehicle energy supply request, and cause the energy supply device to supply energy to the unmanned vehicle to be supplied with energy.

Further, the unmanned vehicle energy supply request is an unmanned vehicle charging request. The communication device is configured to guide an unmanned vehicle to be charged, corresponding to the unmanned vehicle charging request, to be parked at the parking place according to the received unmanned vehicle charging request, and cause the energy supply device to charge the unmanned vehicle to be charged.

Further, the unmanned vehicle energy supply request is an unmanned vehicle battery replacement request. The communication device is configured to guide an unmanned vehicle having a battery to be replaced, corresponding to the unmanned vehicle battery replacement request, to be parked at the parking place according to the received unmanned vehicle battery replacement request, and cause the energy supply device to replace the battery of the unmanned vehicle having the battery to be replaced.

Further, the energy supply station further includes a detection device coupled to the communication device and configured to detect and provide a feedback regarding whether an unmanned vehicle is parked at each of the parking places. The communication device is further configured to determine and upload parking information on any parking place where an unmanned vehicle can be parked based at least on a parking state fed back from the detection device.

Further, the communication device is further configured to acquire an unmanned vehicle charging reservation request, control the energy supply station to perform a charging capability self-check according to the acquired unmanned vehicle charging reservation request, and respond to the unmanned vehicle charging reservation request according to a result of the charging capability self-check.

Further, the communication device comprises: a receiving module configured to receive the unmanned vehicle charging reservation request sent from an unmanned vehicle to be charged to the energy supply station; or an acquisition module configured to acquire the unmanned vehicle charging reservation request sent from the unmanned vehicle to be charged to a service platform.

Further, the energy supply station further includes a blocking device configured to allow an unmanned vehicle to be parked, or block the unmanned vehicle from being parked at a parking place in cooperation with the parking place. The communication device is further configured to deactivate the blocking device and instruct the unmanned vehicle to be charged to be parked at the parking place if it is determined by means of authentication that the unmanned vehicle to be charged is an unmanned vehicle that has successfully reserved, and activate the blocking device and instruct the unmanned vehicle to be charged not to be parked at the parking place if it is determined by means of authentication that the unmanned vehicle to be charged is an unmanned vehicle that has not reserved or has failed to reserve.

Further, the unmanned vehicle energy supply request received by the communication device comprises: an unmanned vehicle energy supply request sent from an unmanned vehicle or a service platform to the energy supply station.

According to another aspect of an embodiment of the present disclosure, there is also provided an energy supply method, which is applied in an energy supply station including one or more parking places for parking unmanned vehicles, an energy supply device configured to supply energy to the unmanned vehicles parked at the parking places, and a communication device. The method includes: receiving, by the communication device, an unmanned vehicle energy supply request; guiding an unmanned vehicle to be supplied with energy, corresponding to the unmanned vehicle energy supply request, to be parked at the parking place according to the received unmanned vehicle energy supply request; and supplying, by the energy supply device, energy to the unmanned vehicle to be supplied with energy.

Further, the unmanned vehicle energy supply request comprises an unmanned vehicle charging request. The method further comprises, prior to the communication device receiving the unmanned vehicle energy supply request: acquiring, by the communication device, an unmanned vehicle charging reservation request; controlling the energy supply station to perform a charging capability self-check according to the acquired unmanned vehicle charging reservation request; and responding to the unmanned vehicle charging reservation request according to a result of the charging capability self-check.

Further, said acquiring, by the communication device, the unmanned vehicle charging reservation request includes: receiving the unmanned vehicle charging reservation request sent from an unmanned vehicle to be charged to the energy supply station; or acquiring the unmanned vehicle charging reservation request sent from the unmanned vehicle to be charged to a service platform.

Further, the energy supply station further includes a blocking device configured to allow an unmanned vehicle to be parked, or block the unmanned vehicle from being parked at a parking place in cooperation with the parking place. After responding to the unmanned vehicle charging reservation request according to the result of the charging capability self-check, the method further includes: deactivating the blocking device and instructing the unmanned vehicle to be charged to be parked at the parking place, by the communication device, if it is determined by means of authentication that the unmanned vehicle to be charged is an unmanned vehicle that has successfully reserved, and activating the blocking device and instructing the unmanned vehicle to be charged not to be parked at the parking place, by the communication device, if it is determined by means of authentication that the unmanned vehicle to be charged is an unmanned vehicle that has not reserved or has failed to reserve.

In the embodiments of the present disclosure, the purpose that the energy supply station is not restricted by a model or a brand of the unmanned vehicle (e.g., an unmanned aerial vehicle) itself when supplying energy to the unmanned vehicle is achieved by adopting a common way of the energy supply station which is provided with the following portions: one or more parking places configured to park the unmanned vehicle; the energy supply device configured to supply energy to the unmanned vehicle which is parked at the parking place; and the communication device configured to receive the unmanned vehicle energy supply request, guide the unmanned vehicle to be supplied with energy, which corresponds to the unmanned vehicle energy supply request, to be parked at the parking place according to the received unmanned vehicle energy supply request, and supply energy to the unmanned vehicle to be supplied with the energy by means of the energy supply device. Therefore, the technical effect of improving the universality and openness of the energy supply station can be achieved. Further, the technical problems of low universality and low openness caused when all the energy supply solutions for the unmanned vehicle are of proprietary and special-purpose solutions can be solved.

BRIEF DESCRIPTION OF DRAWINGS

The figures described herein are provided for further understanding of the present disclosure, and constitute a part of the present disclosure. The illustrative embodiments of the present disclosure and the descriptions thereof are for explaining the present disclosure, rather than unduly limiting the present disclosure. In the figures.

DESCRIPTION OF EMBODIMENTS

The technical solutions according to the embodiments of the present disclosure will be described clearly and completely in the following with reference to the figures in the embodiments of the present disclosure, such that the objects, solutions and advantages of the embodiments of the present disclosure will become more apparent. The described embodiments are only some, rather than all, embodiments of the present disclosure. All other embodiments obtained by those of ordinary skill in the art based on the embodiments of the present disclosure without any inventive efforts are to be encompassed by the scope of the present disclosure.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way may be interchanged where appropriate so that the embodiments of the present disclosure described herein can be implemented in a sequence other than those illustrated or described herein. Furthermore, the terms "including" and "having" and any variants thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

Embodiment 1

There is provided a device embodiment of an energy supply station according to an embodiment of the present disclosure.

Figure 1:
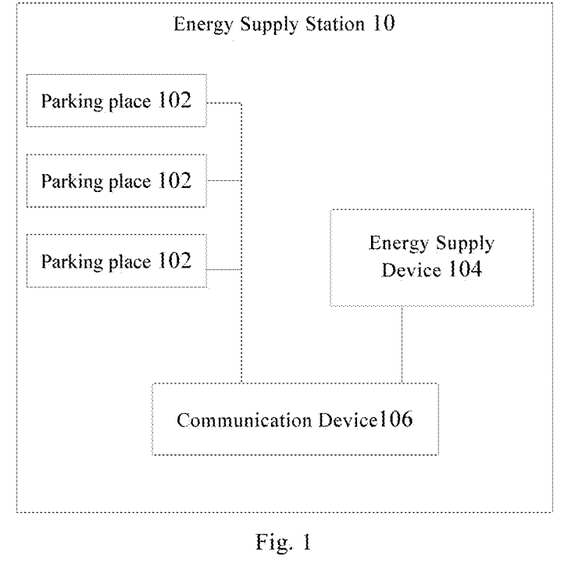
FIG. 1 is a schematic diagram of an energy supply station according to an embodiment of the present disclosure.

FIG. 1 is a schematic diagram of an energy supply station according to the embodiment of the present disclosure. As shown in FIG. 1, the energy supply station 10 includes: one or more parking places 102 for parking unmanned vehicles (e.g., an unmanned aerial vehicle or an unmanned vessel); an energy supply device 104 configured to supply energy to the unmanned vehicles parked at the parking places 102; and a communication device 106 configured to receive an unmanned vehicle energy supply request, guide an unmanned vehicle to be supplied with energy, corresponding to the unmanned vehicle energy supply request, to be parked at the corresponding parking place 102 according to the received unmanned vehicle energy supply request, and cause the energy supply device 104 to supply energy to the unmanned vehicle to be supplied with energy.

It should be noted that each energy supply station can include one or more parking places. As shown in FIG. 1, the energy supply station 10 can include three parking places 102, each of which allows one unmanned aerial vehicle (or one unmanned vessel) to be parked therein. The energy supply device 104 is an energy supply subsystem which can simultaneously supply energy to the unmanned vehicle parked at each parking place 102 according to an instruction. The communication device 106 is a communication subsystem which may receive an unmanned vehicle energy supply request, guide the unmanned vehicle to be supplied with energy, corresponding to the unmanned vehicle energy supply request, to be parked at the corresponding parking place 102 according to the received unmanned vehicle energy supply request, and cause the energy supply device to supply energy to the unmanned vehicle to be supplied with energy. It should be noted that the parking place 102 can exist in any form, as long as the unmanned vehicle can be fixed to the energy supply station 10 conveniently. The parking place 102 can be in a form of a plane similar to an apron, or can be in a form of a grapnel or a hook, as long as the unmanned vehicle can be fixed to the energy supply station 10 for being supplied with energy conveniently. In addition, the energy supply station can further include an authentication subsystem. During the implementation, various components of the energy supply station may be deployed integrally or separately. For example, the authentication subsystem and the energy supply subsystem are deployed separately. After the authentication is successful, the authentication subsystem instructs that the unmanned aerial vehicle (or the unmanned vessel) is parked at a specific energy supply position. In addition, the energy supply station can be deployed fixedly or movably.

Taking the unmanned aerial vehicle as an example, the procedures of supplying energy to the unmanned aerial vehicle by the energy supply station are as follows.

1.1 In a networked state, if there is a need for supplying energy, the unmanned aerial vehicle can send an energy supply request to the energy supply station.

It should be noted that in order to save energy, the unmanned aerial vehicle can turn on the communication module to establish a connection with a wireless communication network for wireless communication when it is monitored that the electric quantity is below a preset low electric quantity threshold. It should be further noted that the specific technology for the wireless communication involved in the present disclosure can be, but not limited to, a mobile communication technology such as WCDMA, CDMA2000, TD-SCDMA, WiMax, LTE/LTE-A or subsequent possible fifth-generation, sixth-generation or Nth-generation mobile communication technology, or a wireless communication technology such as WiFi, Bluetooth or infrared. For convenience of description, the present disclosure will take a fourth-generation mobile communication system LTE/LTE-A as an example, in which a mobile communication terminal is represented as a UE (User Equipment), and an access device is represented as a base station. Further, when the unmanned aerial vehicle uses LTE for communication, in order to reduce power consumption and save electric quantity, it is conceivable to use Cat0 for communication. In addition, the unmanned aerial vehicle needs to apply for an energy supply station that meets a requirement first before sending the energy supply request. Specifically, the unmanned aerial vehicle needs to send information, such as a current location, a flight direction, a flight destination, the remaining electric quantity, a requested electric quantity and charging parameters to an unmanned aerial vehicle service platform (hereinafter referred to as a service platform) to apply for relevant information on the energy supply station. The service platform receives energy supply application information sent by the unmanned aerial vehicle, sends relevant information on an energy supply station (i.e., a target energy supply station) that meets the requirement to the unmanned aerial vehicle, and instructs the unmanned aerial vehicle to move to the target energy supply station to be supplied with energy. Taking the energy supply in a form of charging as an example, for wired charging, the charging parameters can include a voltage, a current, an interface shape or other parameters, and for wireless charging, the charging parameters can include an electromagnetic field frequency, power or other parameters.

1.2 The energy supply station guides the unmanned aerial vehicle that sends the energy supply request to be parked at the corresponding parking place according to the received energy supply request sent by the unmanned aerial vehicle, thereby supplying energy to the unmanned aerial vehicle.

According to the above embodiment, regardless of models and/or brands of the unmanned vehicles, the purpose of supplying energy can be achieved by sending the energy supply request to the energy supply station as long as they need to be supplied with energy. Therefore, a universal, open and complete energy supply solution can be achieved to provide an energy supply service for unmanned vehicles (e.g., an unmanned aerial device) of different manufacturers. It can thus be seen that, by means of the technical solution of the present disclosure, the purpose that the energy supply station is not restricted by the model or the brand of the unmanned vehicle (e.g., an unmanned aerial vehicle) itself when supplying energy to the unmanned vehicle can be achieved. Further, the technical problems of low universality and low openness caused when all the energy supply solutions for an unmanned vehicle are of proprietary and special-purpose solutions can be solved.

Energy can be supplied in a plurality of ways, such as charging, battery replacement, charging/battery replacement, and even refueling according to actual demands. Correspondingly, in some embodiments, the unmanned vehicle energy supply request can be an unmanned vehicle charging request (the unmanned vehicle energy supply request can correspondingly include relevant information on an energy supply type, and the energy supply station can determine the type of energy supplied to the unmanned vehicle according on the information). The communication device is configured to guide the unmanned vehicle to be charged, corresponding to the unmanned vehicle charging request, to be parked at the parking place according to the received unmanned vehicle charging request, and cause the energy supply device to charge the unmanned vehicle to be charged.

For example, taking the unmanned aerial vehicle as an example, when the unmanned aerial vehicle sends a charging request to request charging, the energy supply station serves as a charging station. The communication device is configured to receive the charging request, guide the unmanned vehicle that sends the charging request to be parked at the corresponding parking place according to the received charging request, and cause the energy supply device to charge the unmanned aerial vehicle (which is a charging device in this case).

Correspondingly, in some embodiments, the unmanned vehicle energy supply request can be an unmanned vehicle battery replacement request. The communication device is configured to guide an unmanned vehicle having a battery to be replaced, corresponding to the unmanned vehicle battery replacement request, to be parked at the parking place according to the received unmanned vehicle battery replacement request, and cause the energy supply device to replace the battery of the unmanned vehicle having the battery to be replaced.

For example, taking the unmanned aerial vehicle as an example, when the unmanned aerial vehicle sends a battery replacement request to make a request of battery replacement, the energy supply station serves as a battery replacing station. The communication device is configured to receive the battery replacement request, guide the unmanned vehicle that sends the battery replacement request to be parked at the corresponding parking place according to the received battery replacement request, and cause the energy supply device (which is a battery replacing device in this case) to replace the battery of the unmanned aerial vehicle.

For example, taking an oil-fueled unmanned aerial vehicle as an example, when the oil-fueled unmanned aerial vehicle sends a fuel oil supply request to make a request of being supplied with a fuel oil, the energy supply station serves as an oil filling station. The communication device is configured to receive the fuel oil supply request, guide the oil-fueled unmanned vehicle that sends the fuel oil supply request to be parked at the corresponding parking place according to the received fuel oil supply request, and cause the energy supply device (which is an oil filling device in this case) to supply the fuel oil to the oil-fueled unmanned aerial vehicle.

In order to improve the matching degree between the energy supply station applied by the unmanned aerial vehicle and the unmanned aerial vehicle, preferably, the energy supply station also needs to upload its own relevant information. For example, the energy supply station may upload its own parking state information. In some embodiments, the energy supply station can further include: a detection device coupled to the communication device and configured to detect and provide a feedback regarding whether an unmanned vehicle is parked at each of the parking places. The communication device is further configured to determine and upload parking information on any parking place where an unmanned vehicle can be parked based at least on a parking state fed back from the detection device.

For example, taking an unmanned aerial vehicle as an example, the energy supply station can determine and provide a feedback regarding whether the unmanned aerial vehicle is parked at each of the parking places by the detection device (e.g., various sensors), and determine and upload parking information on any parking place where the unmanned aerial vehicle can be parked based at least on a parking state fed back from the detection device.

Figure 2:
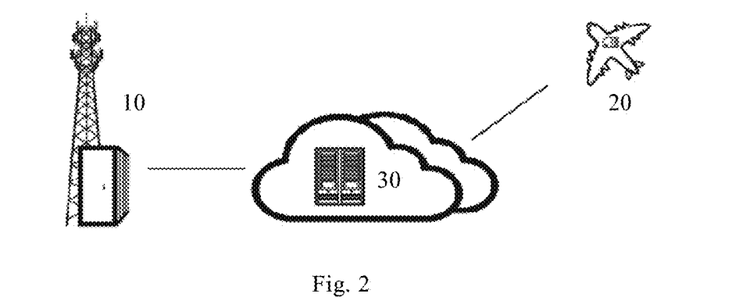
FIG. 2 is a schematic diagram of an optional energy supply system according to an embodiment of the present disclosure.

As shown in FIG. 2, the energy supply station 10, the unmanned aerial vehicle 20 and the service platform 30 can be networked to form an intelligent energy supply system. The energy supply station 10 can include a communication subsystem, an authentication subsystem, a charging subsystem and/or a battery replacing system, a mechanical blocking device, and other components. The service platform 30 can provide the unmanned aerial vehicle with the services including energy supply station selection, parking reservation, charging/battery replacement billing, and the like. It should be noted that the service platform 30 can be configured separately or can be integrated with the energy supply station 10 (i.e., the service platform 30 can be arranged inside the energy supply station 10).

Taking the unmanned aerial vehicle that makes a request for being charged as an example, during the implementation, the service platform 30 makes a preliminary selection on charging stations that meet conditions first according to application information sent by the unmanned aerial vehicle 20, such as the requested electric quantity and charging parameters, and then preferentially selects a charging station within a reachable course in a flight direction of the unmanned aerial vehicle according to parameters sent by the unmanned aerial vehicle, such as a current location, a flight direction and a flight destination. If no charging station within a reachable course is selected in the flight course of the unmanned aerial vehicle, a charging station that is reachable by the nearest course may be selected.

Further, the service platform 30 can calculate a farthest flight distance of the unmanned aerial vehicle 20 according to the remaining electric quantity of the unmanned aerial vehicle 20. In this case, it is necessary to reserve a certain margin to ensure that the unmanned aerial vehicle 20 can smoothly fly to the charging station in abnormal scenes, such as an increase in wind resistance, a bypass to avoid obstacles and the like. In addition, when selecting the charging station, the service platform 30 needs to determine whether the charging station meets a selection requirement in conjunction with the remaining resource capacity (an unmanned aerial vehicle parking place, a remaining electric quantity, and charging parameters) of each charging station.

Further, the service platform 30 can also predict a future idle parking place. For example, the service platform 30 calculates the time when the unmanned aerial vehicle 20 flies to the charging station with reference to a speed of the unmanned aerial vehicle 20 that applies for being charged, and a distance between the unmanned aerial vehicle 20 and the charging station. The service platform can determine whether the charging station has a free parking place to provide a charging service when the unmanned aerial vehicle that is applying for being charged flies to the charging station with reference to a charging progress of the unmanned aerial vehicle that is being charged currently.

Further, if a plurality of unmanned aerial vehicles applies for being charged at the same time, the service platform 30 can also preferentially schedule an emergent, low-electric-quantity unmanned aerial vehicle to land according to a preset take-off and landing scheduling policy with reference to information such as the remaining electric quantity of the unmanned aerial vehicle that is applying for being charged, and a requesting urgency level. Further, when there is no idle parking place and the situation is urgent, the unmanned aerial vehicle service platform can schedule the unmanned aerial vehicle which has a sufficient electric quantity and is parked at the parking place to take off to make space for the unmanned aerial vehicle that is applying for being charged.

In some embodiments, the communication device can be further configured to acquire an unmanned vehicle charging reservation request, control the energy supply station to perform charging capability self-check according to the acquired unmanned vehicle charging reservation request, and respond to the unmanned vehicle charging reservation request according to a result of the charging capability self-check.

For example, taking an unmanned aerial vehicle as an example, after the service platform sends the relevant information on the selected charging station to the unmanned aerial vehicle that applies for being charged, the unmanned aerial vehicle can firstly initiate a charging reservation request, instead of a charging request, to the charging station, to reserve relevant matters of current charging. After receiving the charging reservation request, the charging station needs to perform a charging capability self-check to determine again whether the current charging requirement is truly met.

As shown in FIG. 2, with an unmanned aerial vehicle that applies for being charged as an example, the procedures of reserving a charging station by the unmanned aerial vehicle are as follows.

2.1 During the implementation, the unmanned aerial vehicle receives relative information on the charging station fed back from the service platform and sends a charging reservation request to the charging station. An unmanned aerial vehicle ID is carried in the request.

It should be noted that, if there is no direct communication between the unmanned aerial vehicle and the charging station, a message may be forwarded through the service platform.

2.2 The charging station receives the charging reservation request sent by the unmanned aerial vehicle, and performs a charging capability self-check according to the charging reservation request, for example, to check whether a remaining electric quantity, an idle parking place, charging parameters, and the like of the charging station can meet a charging demand corresponding to the current charging reservation request.

2.3 If the charging station finds that its charging capability can meet the current demand through the self-check, the charging station may send a charging reservation response to the unmanned aerial vehicle, in which information such as an ID of an unmanned aerial vehicle that initiates the current charging reservation request, a reservation success verification code and the like can be carried. If the charging station finds that its charging capability cannot meet the current demand through the self-check, no response may be made.

2.4 After receiving relevant information on the successful reservation, the unmanned aerial vehicle flies to a charging station with which a reservation relationship is established, and initiates a charging request to the charging station. The charging request message can also need to carry information, such as an unmanned aerial vehicle ID, a reservation success verification code and the like.

2.5 The charging station receives the charging request sent by the unmanned aerial vehicle, analyzes the information, such as the unmanned aerial vehicle ID and the reservation success verification code, and then determines whether the unmanned aerial vehicle is the previously reserved unmanned aerial vehicle according to an analysis result.

2.6 If it is determined that the unmanned aerial vehicle is the previously reserved unmanned aerial vehicle, the charging station will send a charging response message to the unmanned aerial vehicle and accept a charging request from the unmanned aerial vehicle. At the same time, the charging station may deactivate the blocking device (including a mechanical blocking device or an electromagnetic blocking device, a specific structure of which can be designed according to actual situations, and the demand can be met as long as an unreserved unmanned aerial vehicle can be blocked from being parked at a parking place in the case of the safety), and instruct that the unmanned aerial vehicle is parked at a parking place corresponding to the blocking device.

It should be noted that, in the embodiment of the present disclosure, a wireless communication network between the unmanned aerial vehicle and the charging station can be a shared communication network, or can be a dedicated communication network for a charging station. The service platform can be an actual physical device or a software module. The service platform can be deployed locally or in the cloud, or can be deployed in a distributed manner or in a centralized manner.

It should be noted that the charging operation of the charging station described above to the unmanned aerial vehicle and a processing procedure thereof are also applicable to a battery replacing operation and related processing procedures, which will not be described herein again.

In some embodiments, the communication device includes: a receiving module configured to receive the unmanned vehicle charging reservation request sent from an unmanned vehicle to be charged to the energy supply station; or an acquisition module configured to acquire the unmanned vehicle charging reservation request sent from the unmanned vehicle to be charged to a service platform.

That is, taking an unmanned aerial vehicle as an example, when reserving an energy supply station, the unmanned aerial vehicle can directly send a charging reservation request to the energy supply station to make a reservation with the energy supply station itself, or send the charging reservation request to the service platform, such that the service platform makes a reservation with the unmanned aerial vehicle instead of the energy supply station. In this way, a reservation channel can be expanded, and the intelligence of the energy supply system can be improved.

In some embodiments, the energy supply station can further include a blocking device configured to allow an unmanned vehicle to be parked, or block the unmanned vehicle from being parked at a parking place in cooperation with the parking place. The communication device is further configured to deactivate the blocking device and instruct the unmanned vehicle to be charged to be parked at the parking place if it is determined by means of authentication that the unmanned vehicle to be charged is an unmanned vehicle that has successfully reserved, and activate the blocking device and instruct the unmanned vehicle to be charged not to be parked at the parking place if it is determined by means of authentication that the unmanned vehicle to be charged is an unmanned vehicle that has not reserved or has failed to reserve.

The blocking device can be a mechanical blocking device or an electromagnetic blocking device. The blocking device is turned on normally, and in this case, the unmanned vehicle is blocked from being parked at a parking place. The blocking device can be deactivated, that is, being changed from an activated state to a deactivate state. In this case, the unmanned vehicle is allowed to be parked at the parking place.

Taking an unmanned aerial vehicle as an example, when the unmanned aerial vehicle flies to a charging station to apply for being charged, the charging station can authenticate the unmanned aerial vehicle. If the authentication is successful, it is indicated that the unmanned aerial vehicle is the previously reserved unmanned aerial vehicle, and then the charging station can provide a charging service for the unmanned aerial vehicle. Therefore, the blocking device can be deactivated so that the unmanned aerial vehicle can be parked at the corresponding parking place. If the authentication fails, it is indicated that the unmanned aerial vehicle is not the previously reserved unmanned aerial vehicle (including, but not limited to an unmanned aerial vehicle that has failed to be reserved or has not undergone any reservation operation), and the charging station in this case may not provide a charging service for the unmanned aerial vehicle. Therefore, the blocking device can be kept to be activated, such that the unmanned aerial vehicle cannot be parked at the corresponding parking place. In this way, the safety of the energy supply system can be fully considered for refusing an unauthorized access of an unauthorized unmanned aerial vehicle. Therefore, the effects of intelligent selection and charging reservation of the charging station can be achieved.

In some embodiments, the unmanned vehicle energy supply request received by the communication device includes: an unmanned vehicle energy supply request sent from an unmanned vehicle or a service platform to the energy supply station.

That is, the unmanned vehicle can directly send the energy supply request to the energy supply station or forward the energy supply request via the service platform. The former can be applied in a scenario where the unmanned vehicle can communicate with an energy supply station, and the latter can be applied in a scenario where the unmanned vehicle cannot communicate with the energy supply station.

Embodiment 2

According to an embodiment of the present disclosure, there is provided a method embodiment of an energy supply method. It should be noted that the steps illustrated in the flowchart of the drawings may be performed in a computer system, such as a set of computer executable instructions. In addition, although a logical sequence is shown in the flowchart, in some cases the steps shown or described may be performed in a different order than the ones described herein.

Figure 3:
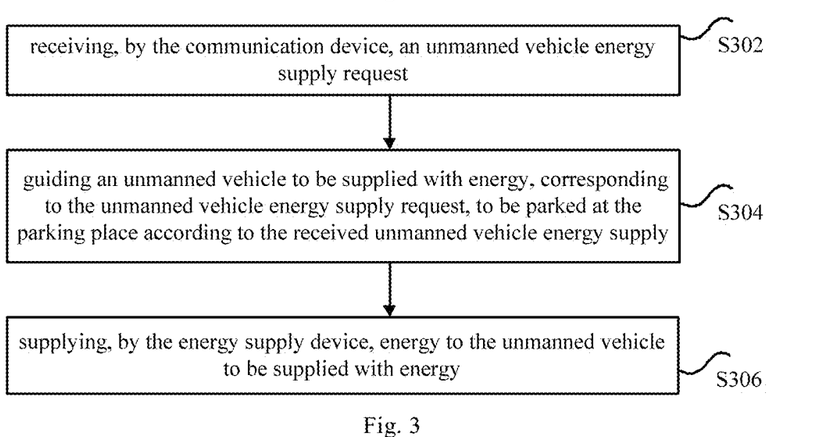
FIG. 3 is a flowchart of an energy supply method according to an embodiment of the present disclosure.

The energy supply method is applied in an energy supply station, for example, may be applied in the energy supply station shown in FIG. 1. The energy supply station includes one or more parking places for parking an unmanned vehicle, an energy supply device configured to supply energy to the unmanned vehicles parked at the parking places, and a communication device. FIG. 3 is a flowchart of an energy supply method according to an embodiment of the present disclosure. As shown in FIG. 3, the method includes the following steps:

S302, receiving, by the communication device, an unmanned vehicle energy supply request;

S304, guiding an unmanned vehicle to be supplied with energy, corresponding to the unmanned vehicle energy supply request, to be parked at the parking place according to the received unmanned vehicle energy supply request; and S306, supplying, by the energy supply device, energy to the unmanned vehicle to be supplied with energy.

It should be noted that: each energy supply station can include one or more parking places. As shown in FIG. 1, the energy supply station 10 can include three parking places 102 each of which allows one unmanned aerial vehicle (or one unmanned vessel) to be parked therein. The energy supply device 104 is an energy supply subsystem which can simultaneously supply energy to the unmanned vehicle parked at each parking place 102 according to an instruction. The communication device 106 is a communication subsystem which may receive an unmanned vehicle energy supply request, guide the unmanned vehicle to be supplied with energy, corresponding to the unmanned vehicle energy supply request, to be parked at the corresponding parking place 102 according to the received unmanned vehicle energy supply request, and cause the energy supply device to supply energy to the unmanned vehicle to be supplied with energy. In addition, the energy supply station can further include an authentication subsystem. During the implementation, various components of the energy supply station may be deployed integrally or separately. For example, the authentication subsystem and the energy supply subsystem are deployed separately. After the authentication is successful, the authentication subsystem instructs that the unmanned aerial vehicle (or the unmanned vessel) is parked at a specific energy supply position. In addition, the energy supply station can be deployed fixedly or movably.

Taking an unmanned aerial vehicle as an example, the procedures of supplying energy to the unmanned aerial vehicle by the energy supply station are as follows.

1.1 In a networked state, if there is a need for supplying energy, the unmanned aerial vehicle may send an energy supply request to the energy supply station.

It should be noted that in order to save energy, the unmanned aerial vehicle can turn on the communication module to establish a connection with a wireless communication network for wireless communication when it is monitored that the electric quantity is below a preset low electric quantity threshold. It should be further noted that the specific technology for the wireless communication involved in the present disclosure can be, but not limited to, a mobile communication technology such as WCDMA, CDMA2000, TD-SCDMA, WiMax, LTE/LTE-A or subsequent possible fifth-generation, sixth-generation or Nth-generation mobile communication technology, or a wireless communication technology such as WiFi, Bluetooth or infrared. For convenience of description, the present disclosure will take a fourth-generation mobile communication system LTE/LTE-A as an example, in which a mobile communication terminal is represented as a UE (User Equipment), and an access device is represented as a base station. Further, when the unmanned aerial vehicle uses LTE for communication, in order to reduce power consumption and save electric quantity, it is conceivable to use Cat0 for communication. In addition, the unmanned aerial vehicle needs to apply for an energy supply station that meets a requirement first before sending the energy supply request. Specifically, the unmanned aerial vehicle needs to send information, such as a current location, a flight direction, a flight destination, the remaining electric quantity, a requested electric quantity and charging parameters to an unmanned aerial vehicle service platform (hereinafter referred to as a service platform) to apply for relevant information on the energy supply station. The service platform receives energy supply application information sent by the unmanned aerial vehicle, sends relevant information on an energy supply station (i.e., a target energy supply station) that meets the requirement to the unmanned aerial vehicle, and instructs the unmanned aerial vehicle to move to the target energy supply station to be supplied with energy. Taking the energy supply in a form of charging as an example, for wired charging, the charging parameters can include a voltage, a current, an interface shape or other parameters, and for wireless charging, the charging parameters can include an electromagnetic field frequency, power or other parameters.

1.2 The energy supply station guides the unmanned aerial vehicle that sends the energy supply request to be parked at the corresponding parking place according to the received energy supply request sent by the unmanned aerial vehicle, thereby supplying energy to the unmanned aerial vehicle.

According to the above embodiment, regardless of models and/or brands of the unmanned vehicles, the purpose of supplying energy can be achieved by sending the energy supply request to the energy supply station as long as they need to be supplied with energy. Therefore, a universal, open and complete energy supply solution can be achieved to provide an energy supply service for unmanned vehicles (e.g., an unmanned aerial device) of different manufacturers. It can thus be seen that, by means of the technical solution of the present disclosure, the purpose that the energy supply station is not restricted by the model or the brand of the unmanned vehicle (e.g., an unmanned aerial vehicle) itself when supplying energy to the unmanned vehicle can be achieved. Further, the technical problems of low universality and low openness caused when all the energy supply solutions for an unmanned vehicle are of proprietary and special-purpose solutions can be solved.

It should be noted that the other components of the energy supply station and the connection relationships and functions of the components are the same as those in Embodiment 1, and will not be described herein again.

Energy may be supplied in a plurality of ways, such as charging, battery replacement, or charging/battery replacement. Correspondingly, in some embodiments, the unmanned vehicle energy supply request can include an unmanned vehicle charging request. Therefore, prior to the communication device receiving the unmanned vehicle energy supply request, the method can further include:

S2, acquiring, by the communication device, an unmanned vehicle charging reservation request;

S4, controlling the energy supply station to perform a charging capability self-check according to the acquired unmanned vehicle charging reservation request; and S6, responding to the unmanned vehicle charging reservation request according to a result of the charging capability self-check.

For example, taking an unmanned aerial vehicle as an example, after the service platform sends relevant information on the selected charging station to the unmanned aerial vehicle that applies for being charged, the unmanned aerial vehicle can firstly initiate a charging reservation request, instead of a charging request, to the charging station, to reserve relevant matters of current charging. After receiving the charging reservation request, the charging station needs to perform a charging capability self-check to determine again whether the current charging requirement is truly met.

As shown in FIG. 2, taking an unmanned aerial vehicle that applies for being charged as an example, the procedures that the unmanned aerial vehicle reserves a charging station are the same as those in Embodiment 1, and will not be described herein again.

Further, in some embodiments, said acquiring, by the communication device, the unmanned vehicle charging reservation request can include:

S8, receiving the unmanned vehicle charging reservation request sent from the unmanned vehicle to be charged to the energy supply station; or S10, acquiring the unmanned vehicle charging reservation request sent from the unmanned vehicle to be charged to the service platform.

That is, taking an unmanned aerial vehicle as an example, when reserving an energy supply station, the unmanned aerial vehicle can directly send a charging reservation request to the energy supply station to make a reservation with the energy supply station itself, or send the charging reservation request to the service platform, such that the service platform makes a reservation with the unmanned aerial vehicle instead of the energy supply station. In this way, a reservation channel can be expanded, and the intelligence of the energy supply system can be improved.

In some embodiments, the energy supply station can further include a blocking device configured to allow an unmanned vehicle to be parked, or block the unmanned vehicle from being parked at a parking place in cooperation with the parking place. After responding to the unmanned vehicle charging reservation request according to the result of the charging capability self-check, the method can further include:

S12, deactivating the blocking device and instructing the unmanned vehicle to be charged to be parked at the parking place if it is determined by means of authentication that the unmanned vehicle to be charged is an unmanned vehicle that has successfully reserved, by the communication device; or S14, activating the blocking device and instruct the unmanned vehicle to be charged not to be parked at the parking place if it is determined by means of authentication that the unmanned vehicle to be charged is an unmanned vehicle that has not reserved or has failed to reserve, by the communication device.

The blocking device can be a mechanical blocking device or an electromagnetic blocking device. The blocking device is turned on normally, and in this case, the unmanned vehicle is blocked from being parked at a parking place. The blocking device can be deactivated, that is, being changed from an activated state to a deactivate state. In this case, the unmanned vehicle is allowed to be parked at the parking place.

Taking an unmanned aerial vehicle as an example, when the unmanned aerial vehicle flies to a charging station to apply for being charged, the charging station can authenticate the unmanned aerial vehicle. If the authentication is successful, it is indicated that the unmanned aerial vehicle is the previously reserved unmanned aerial vehicle, and then the charging station can provide a charging service for the unmanned aerial vehicle. Therefore, the blocking device can be deactivated so that the unmanned aerial vehicle can be parked at the corresponding parking place. If the authentication fails, it is indicated that the unmanned aerial vehicle is not the previously reserved unmanned aerial vehicle (including, but not limited to an unmanned aerial vehicle that has failed to be reserved or has not undergone any reservation operation), and the charging station in this case may not provide a charging service for the unmanned aerial vehicle. Therefore, the blocking device can be kept to be activated, such that the unmanned aerial vehicle cannot be parked at the corresponding parking place. In this way, the safety of the energy supply system can be fully considered for refusing an unauthorized access of an unauthorized unmanned aerial vehicle. Therefore, the effects of intelligent selection and charging reservation of the charging station can be achieved.

Figure 4:
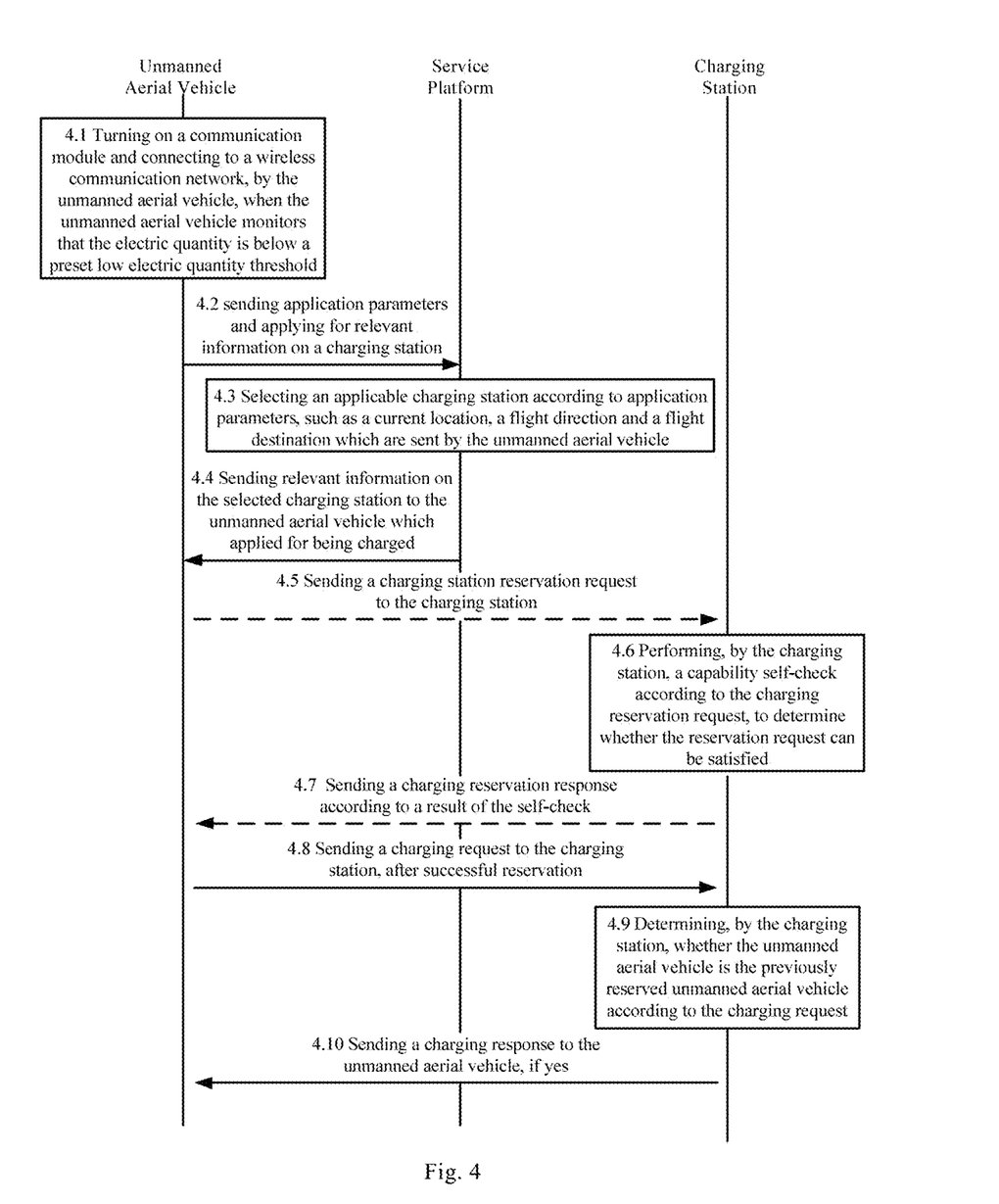
FIG. 4 is a flowchart of an optional energy supply method according to an embodiment of the present disclosure.

Hereinafter, the present disclosure will be described in detail by taking an unmanned aerial vehicle that applies for being charged as an example in conjunction with FIG. 4:

4.1 when an unmanned aerial vehicle monitors that the electric quantity is below a preset low electric quantity threshold, turning on a communication module and connecting to a wireless communication network, by the unmanned aerial vehicle;

4.2 sending application parameters and applying for relevant information on a charging station, by the unmanned aerial vehicle;

4.3 selecting, by a service platform, an applicable charging station according to application parameters, such as a current location, a flight direction and a flight destination which are sent by the unmanned aerial vehicle;

4.4 sending, by the service platform, relevant information on the selected charging station to the unmanned aerial vehicle which applied for being charged;

4.5 sending, by the unmanned aerial vehicle, a charging station reservation request to the charging station;

4.6 performing, by the charging station, a capability self-check according to the charging reservation request, to determine whether the reservation request can be satisfied;

4.7 sending, by the charging station, a charging reservation response according to a result of the self-check;

4.8 after successful reservation, sending, by the unmanned aerial vehicle, a charging request to the charging station;

4.9 determining, by the charging station, whether the unmanned aerial vehicle is the previously reserved unmanned aerial vehicle according to the charging request; and 4.10 if yes, sending, by the charging station, a charging response to the unmanned aerial vehicle.

The serial numbers of the embodiments of the present disclosure are merely for description, and do not represent the advantages and disadvantages of the embodiments.

In the above-mentioned embodiments of the present disclosure, the descriptions of the embodiments have their respective emphases. For the parts that are not detailed in a certain embodiment, reference can be made to the related descriptions of other embodiments.

It should be understood that in the embodiments provided by the present disclosure, the disclosed technical contents can be achieved by other means. The device embodiments described above are merely schematic. For example, the partitioning of the units can be a logical functional partitioning. There may be other partitioning modes during actual implementation. For example, multiple units or components can be combined or integrated into another system, or some features can be ignored or not executed. In addition, mutual coupling or direct coupling or communication connection that is shown or discussed can be indirect coupling or communication connection through some interfaces, units or modules, and can be in electrical or other forms.

The units described as separate components may or may not be physically separated, and the components for unit display may or may not be physical units, that is, may be located in one place or distributed on a plurality of units. Part or all of the units can be selected according to actual needs to achieve the objective of the solutions of the embodiments.

In addition, all functional units in the embodiments of the present disclosure can be integrated into one processing unit. Or, each unit exists physically independently. Or, two or more units can be integrated into one unit. The above integrated units can be embodied in the form of hardware or a software functional unit.

The integrated units, if embodied in the form of the software functional unit and sold or used as a standalone product, can be stored in a computer readable storage medium. Based on such understanding, the technical solution of the present disclosure in essence, or a part that contributes to the related art, or all or part of the technical solution, can be embodied in the form of a software product. The computer software product is stored in a storage medium and includes a plurality of instructions for a computer device (which can be a personal computer, a server, a network device or the like) to perform all or part of the steps of the method described in the embodiments of the present disclosure. The foregoing storage medium includes: a USB flash disk, a Read-Only Memory (ROM), a Random Access Memory (RAM), a removable hard disk, a magnetic disk, an optical disk, or other various media that can store program codes.

Finally, it should be noted the above embodiments are merely used to illustrate the technical solutions of the present disclosure, other than making any limitation thereon. While the present disclosure has been described in detail with reference to the above embodiments, various modifications of the technical solutions or equivalent alternatives of some or all of the technical features can be made by those skilled in the art. These modifications or alternatives are to be encompassed by the scope of the present disclosure.

What is claimed is:

1. An energy supply station, comprising:

one or more parking places for parking unmanned vehicles;

an energy supply device configured to supply energy to the unmanned vehicles parked at the parking places;

a communication device configured to receive an unmanned vehicle energy supply request, guide an unmanned vehicle to be supplied with energy, corresponding to the unmanned vehicle energy supply request, to be parked at the parking place according to the received unmanned vehicle energy supply request, and cause the energy supply device to supply energy to the unmanned vehicle to be supplied with energy; and a blocking device configured to allow an unmanned vehicle to be parked, or block the unmanned vehicle from being parked at a parking place in cooperation with the parking place, wherein the unmanned vehicle energy supply request is an unmanned vehicle charging request, and the communication device is configured to guide an unmanned vehicle to be charged, corresponding to the unmanned vehicle charging request, to be parked at the parking place according to the received unmanned vehicle charging request, and cause the energy supply device to charge the unmanned vehicle to be charged;

the communication device is further configured to acquire an unmanned vehicle charging reservation request, control the energy supply station to perform a charging capability self-check according to the acquired unmanned vehicle charging reservation request, and respond to the unmanned vehicle charging reservation request according to a result of the charging capability self-check; and the communication device is further configured to deactivate the blocking device and instruct the unmanned vehicle to be charged to be parked at the parking place if it is determined by means of authentication that the unmanned vehicle to be charged is an unmanned vehicle that has successfully reserved, and activate the blocking device and instruct the unmanned vehicle to be charged not to be parked at the parking place if it is determined by means of authentication that the unmanned vehicle to be charged is an unmanned vehicle that has not reserved or has failed to reserve.

2. The energy supply station according to claim 1, wherein the unmanned vehicle energy supply request is an unmanned vehicle battery replacement request, and
wherein the communication device is configured to guide an unmanned vehicle having a battery to be replaced, corresponding to the unmanned vehicle battery replacement request, to be parked at the parking place according to the received unmanned vehicle battery replacement request, and cause the energy supply device to replace the battery of the unmanned vehicle having the battery to be replaced.

3. The energy supply station according to claim 1, wherein
the energy supply station further comprises a detection device coupled to the communication device and configured to detect and provide a feedback regarding whether an unmanned vehicle is parked at each of the parking places; and
the communication device is further configured to determine and upload parking information on any parking place where an unmanned vehicle can be parked based at least on a parking state fed back from the detection device.

4. The energy supply station according to claim 1, wherein the communication device comprises:
a receiving module configured to receive the unmanned vehicle charging reservation request sent from an unmanned vehicle to be charged to the energy supply station; or
an acquisition module configured to acquire the unmanned vehicle charging reservation request sent from the unmanned vehicle to be charged to a service platform.

5. The energy supply station according to claim 1, wherein the unmanned vehicle energy supply request received by the communication device comprises: an unmanned vehicle energy supply request sent from an unmanned vehicle or a service platform to the energy supply station.

6. An energy supply method, applied in an energy supply station comprising one or more parking places for parking unmanned vehicles, an energy supply device configured to supply energy to the unmanned vehicles parked at the parking places, a communication device, and a blocking device configured to allow an unmanned vehicle to be parked, or block the unmanned vehicle from being parked at a parking place in cooperation with the parking place,
the method comprising:
receiving, by the communication device, an unmanned vehicle energy supply request;
guiding an unmanned vehicle to be supplied with energy, corresponding to the unmanned vehicle energy supply request, to be parked at the parking place according to the received unmanned vehicle energy supply request; and
supplying, by the energy supply device, energy to the unmanned vehicle to be supplied with energy;
wherein the unmanned vehicle energy supply request comprises an unmanned vehicle charging request, and the method further comprises, prior to the communication device receiving the unmanned vehicle energy supply request:
acquiring, by the communication device, an unmanned vehicle charging reservation request;
controlling the energy supply station to perform a charging capability self-check according to the acquired unmanned vehicle charging reservation request; and
responding to the unmanned vehicle charging reservation request according to a result of the charging capability self-check;
wherein the communication device is configured to guide an unmanned vehicle to be charged, corresponding to the unmanned vehicle charging request, to be parked at the parking place according to the received unmanned vehicle charging request, and cause the energy supply device to charge the unmanned vehicle to be charged; and
the communication device is further configured to deactivate the blocking device and instruct the unmanned vehicle to be charged to be parked at the parking place if it is determined by means of authentication that the unmanned vehicle to be charged is an unmanned vehicle that has successfully reserved, and activate the blocking device and instruct the unmanned vehicle to be charged not to be parked at the parking place if it is determined by means of authentication that the unmanned vehicle to be charged is an unmanned vehicle that has not reserved or has failed to reserve.

* * * * *